(12) United States Patent
Charbon

(10) Patent No.: US 8,974,112 B2
(45) Date of Patent: Mar. 10, 2015

(54) BARREL INCLUDING AN ADDITIONAL ELASTIC MEANS OF ACCUMULATING ENERGY

(75) Inventor: Christian Charbon, Chézard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 76 days.

(21) Appl. No.: 13/462,272

(22) Filed: May 2, 2012

(65) Prior Publication Data

US 2012/0281511 A1 Nov. 8, 2012

(30) Foreign Application Priority Data

May 3, 2011 (EP) .................................... 11164624

(51) Int. Cl.
| | | |
|---|---|---|
| G04B 1/10 | (2006.01) | |
| F16F 1/10 | (2006.01) | |
| G04B 1/14 | (2006.01) | |
| G04B 1/22 | (2006.01) | |

(52) U.S. Cl.
CPC . F16F 1/10 (2013.01); G04B 1/145 (2013.01); G04B 1/225 (2013.01)
USPC .......................................... 368/140; 368/203

(58) Field of Classification Search
USPC .............. 368/140–143, 203; 185/37; 242/371
See application file for complete search history.

(56) References Cited

U.S. PATENT DOCUMENTS

| | | | | |
|---|---|---|---|---|
| 3,018,097 | A * | 1/1962 | Johansson ...................... | 267/156 |
| 3,600,973 | A * | 8/1971 | Haag ................................ | 74/524 |
| 3,621,650 | A * | 11/1971 | Schnyder ....................... | 368/144 |
| 3,625,502 | A | 12/1971 | Joerres | |
| 5,539,708 | A * | 7/1996 | Guignard ....................... | 368/140 |
| 6,307,815 | B1 * | 10/2001 | Polosky et al. ............... | 368/220 |
| 6,575,519 | B2 * | 6/2003 | Henning .......................... | 296/98 |
| 2009/0016173 | A1* | 1/2009 | Hessler et al. ................. | 368/140 |
| 2011/0114779 | A1* | 5/2011 | Tsubaki ......................... | 242/372 |
| 2011/0292770 | A1* | 12/2011 | Damasko ....................... | 368/175 |
| 2012/0106303 | A1* | 5/2012 | Von Gunten et al. .......... | 368/175 |

FOREIGN PATENT DOCUMENTS

| | | | |
|---|---|---|---|
| CH | 381 158 A | | 4/1964 |
| DE | 807 378 C | | 6/1951 |
| JP | 2000-048924 | * | 2/2000 |

OTHER PUBLICATIONS

Protuberant—dictionary.com; Oct. 24, 2014.*
Protuberance—dictionary.com; Oct. 24, 2014.*
European Search Report of EP 11 16 4624 dated Nov. 16, 2011.

* cited by examiner

Primary Examiner — Sean Kayes
(74) Attorney, Agent, or Firm — Griffin & Szipl, P.C.

(57) ABSTRACT

The invention relates to a barrel. According to the invention, the barrel further includes a device for increasing the torque of said at least one spring including additional elastic energy accumulating means provided in addition to the spiral shape of said at least one spring, said elastic means being added to said at least one spring so that the barrel torque is personalized according to the winding tension of said at least one spring.

14 Claims, 1 Drawing Sheet

BARREL INCLUDING AN ADDITIONAL ELASTIC MEANS OF ACCUMULATING ENERGY

This application claims priority from European Patent Application No. 11164624.6 filed May 3, 2011, the entire disclosure of which is incorporated herein by reference.

FIELD OF THE INVENTION

The invention relates to a barrel including a device for increasing torque and, more specifically, a barrel of this type including an additional elastic means of accumulating energy.

BACKGROUND OF THE INVENTION

Current barrels 1, as illustrated in FIG. 1, are generally formed by a box 3 called a "drum" intended to receive a pivot arbour 5 and a spring 7. Spiral spring 7 has a length L, a height H and thickness E. Spring 7 is mounted between the internal wall of box 3 and the external wall of pivot arbour 5. Box 3 is generally closed by a cover 9. Spring 7 can thus be wound to supply mechanical energy to the movement of the timepiece in which it is integrated.

The problem raised by this configuration of current springs is that a constant torque is not provided throughout the entire letting down of said springs, which causes a variation in the amplitude of the balance detrimental to the precision of the timepiece movement.

Moreover, it is difficult to reconcile the shape of current substantially S-shaped springs at rest and the space required thereby with positive fabrication, i.e. photolithography followed by electroforming, or negative fabrication, i.e. photolithography followed by etching. Indeed, the substrates used are not large enough and/or an insufficient number of springs are made on a single substrate making production costs unacceptable.

SUMMARY OF THE INVENTION

It is an object of the present invention to overcome all of part of aforecited drawbacks by proposing a barrel whose spring is more compact at rest and whose torque is less dependent on the degree of winding of the spring.

The invention therefore relates to a barrel including a box for receiving a pivot arbour and at least one spring, wherein said at least one spiral spring is mounted between the internal wall of the box and the external wall of the pivot arbour, and can be wound to supply mechanical energy, characterized in that the barrel further includes a device for increasing the torque of said at least one spring including an additional elastic means of accumulating energy provided in addition to the spiral shape of said at least one spring, said elastic means being added to said at least one spring so that the barrel torque is personalised according to the winding tension of said at least one spring.

It is thus clear that the quantity of material of the spring which "works", i.e. which is capable of being deformed to store energy, is very substantially increased which enables the barrel to maintain a substantially equivalent or higher torque compared to barrels including current S-shaped springs.

This also enables the barrel torque to be personalised, for example by making it more constant to improve the isochronism of a timepiece. Indeed, since the compactness of a spring according to the invention is more suited to said positive and/or negative fabrication methods, it is possible to mass produce asymmetrical springs which allow the barrel torque to be personalised according to the winding tension of said springs.

In accordance with other advantageous features of the invention:
- the additional elastic energy accumulating means is formed by elastic protuberances which project over all or at least part of the coils of said at least one spring;
- at least one protuberance has a section which is constant or non-constant;
- at least one protuberance has a curve which is constant or non-constant;
- at least two protuberances are contiguous;
- at least one protuberance extends from said at least one spring towards said arbour or from said at least one spring towards the internal wall of said box;
- the additional elastic energy accumulating means is integral with said at least one spring;
- said at least one spring and/or the additional elastic energy accumulating means are formed from a base of silicon or a metal or metallic alloy base;
- the barrel includes several stacked springs working in parallel.

The invention also relates to a timepiece, characterized in that it includes a barrel according to any of the preceding variants.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

As explained hereinbefore, it is an object of the present invention to propose a barrel wherein the torque provided is less dependent on the degree of winding of the spring, but also wherein the torque is substantially equivalent or increased to maintain or improve the autonomy of the timepiece movement in which the barrel is mounted.

According to the invention, in addition to the usual spring, the barrel includes a device for increasing the torque of said spring including an additional elastic energy accumulating means provided in addition to the spiral shape of said at least one spring, said elastic means being added to said spring so that the barrel torque is personalised according to the winding tension of said at least one spring. Preferably according to the invention, the additional elastic energy accumulating means is formed by elastic protuberances which project over at least one part of the coils of said spring. In their wound state, the protuberances follow the spiral, i.e. they are forced between the box and/or the remainder of the spring and/or the pivot arbour like an ordinary spring.

Figure 1:
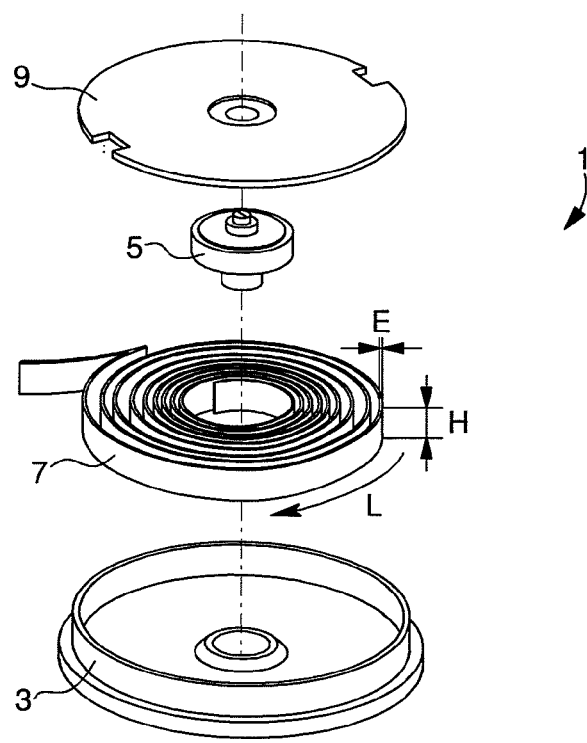
FIG. 1 is a view of a current barrel.
Figures 2, 3:
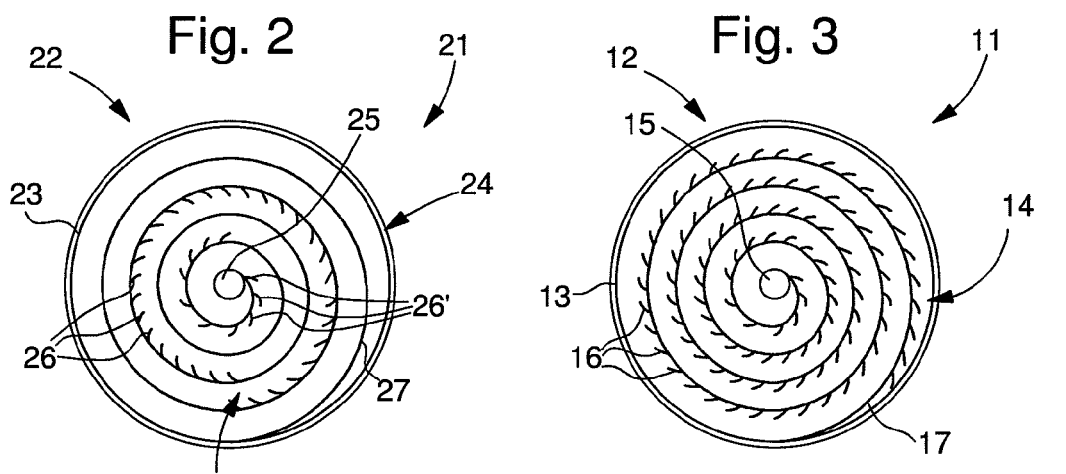
FIGS. 2 and 3 are top views of possible distributions of torque increasing devices according to the invention.

Non-exhaustive examples of the distribution of torque increasing devices 12, 22, 22' of the barrel 11, 21 are shown in FIGS. 2 and 3. FIG. 3 shows that the torque increasing device 12 of barrel 11 includes a single series of additional elastic energy accumulating means 14, formed by a plurality of elastic protuberances 16 which are distributed over the entire length L of spring 17 and which extend from spring 17 towards the internal wall of box 13.

FIG. 2 shows that the torque increasing devices 22, 22' of barrel 21 each include a series of additional elastic energy accumulating means 24, 24' formed by a plurality of elastic protuberances 26, 26' which are each distributed over one part of the length L of spring 27. Thus, the distal series 24 of first device 22 is distributed over the external coil or an intermediate coil of spring 27 and includes elastic protuberances 26 which extend from spring 27 towards arbour 25. Moreover, the proximal series 24' of the second device 22' is distributed over the inner coil of spring 27 and includes elastic protuberances 26' which extend from spring 27 towards the internal wall of box 23.

It is thus clear that a barrel according to the invention may include one or several torque increasing devices distributed over one portion or the entire length of the spring so that the quantity of material of the spring which "works", i.e. which is capable of being deformed to store energy, is very substantially increased, which enables the barrel to maintain a substantially constant equivalent torque compared to current S-shaped springs, while being much more compact at rest.

By way of example, a current S-shaped spring at rest, i.e. prior to being mounted in the barrel box which is 1.2 cm in diameter, has a rectangular space requirement of around 6 cm by 15 cm. Advantageously according to the invention, the space requirement of a spring at rest according to the invention is reduced to a diameter of between 1 and 5 cm with a pitch of between 0.1 and 5 mm between the coils.

Of course, in the FIG. 2 view, it is also possible to envisage that a single device over the entire length of the spring also comprises two series of additional elastic energy accumulating means, the first series of which could include elastic protuberances that extend from the spring towards the arbour and the second series could comprise elastic protuberances that extend from the spring towards the internal wall of the box.

Non-exhaustive variants of elastic protuberances 36, 46, 56, 76 are shown in FIGS. 4 to 7. In these Figures, the additional elastic energy accumulating means, i.e. elastic protuberances 36, 46, 56, 76 are integral with the spring 37, 47, 57, 77. It is not, however, essential for the additional elastic energy accumulating means to be integral with the spring. By way of example, they may be fabricated separately, then joined together and finally integrated in the barrel.

Figures 4, 5, 6:
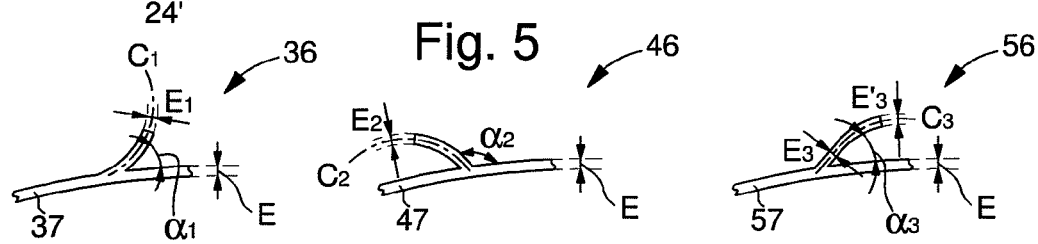
FIGS. 4 to 7 are possible variants of the additional elastic energy accumulating means according to the invention.

In a first variant illustrated in FIG. 4, protuberance 36 is integral with spring 37 and forms a projecting portion extending in a curve $C_1$, which may be a radius forming an acute angle $\alpha_1$ relative to the curvature of spring 37. Finally, protuberance 36 has a thickness $E_1$ which may be equal to or different from thickness E of spring 37.

In a second variant illustrated in FIG. 5, protuberance 46 is integral with spring 47 and forms a projecting portion extending in a curve $C_2$, which may be a radius forming an obtuse angle $\alpha_2$ relative to the curvature of spring 47. Finally, protuberance 46 has a thickness $E_2$ which may be equal to or different from thickness E of spring 47.

In a third variant illustrated in FIG. 6, protuberance 56 is integral with spring 57 and forms a projecting portion extending in a non-symmetrical curve $C_3$, forming an acute initial angle $\alpha_3$ relative to the curvature of spring 57. Finally, protuberance 56 has a variable thickness with a minimum thickness $E_3$ and a maximum thickness $E_3'$ which may each be equal to or different from thickness E of spring 57.

Figure 7:
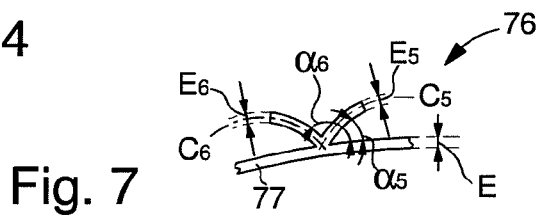

Finally, in a fourth variant illustrated in FIG. 7, two projecting portions are joined to form a protuberance 76, which is integral with spring 77 at a single place thereby forming a base. Protuberance 76 is in a substantially projecting Y-shape wherein each branch starting from said base extends in a curve $C_5$, $C_6$ each of which may be a radius forming angles $\alpha_5$ and $\alpha_6$ which are respectively acute and obtuse relative to the curvature of spring 77. Finally the two branches of protuberance 76 respectively have thicknesses $E_5$, $E_6$ which may each be equal to or different from the thickness E of spring 77.

It is therefore clear that at least one protuberance 16, 26, 36, 46, 56, 76 of the additional elastic energy accumulating means may have a constant or non-constant section, i.e. the section comprised in the plane including the thickness and height, and/or a curvature which is constant or non-constant. Moreover, at least two of these protuberances 16, 26, 36, 46, 56, 76 may be contiguous. Finally, they may be distributed symmetrically or non-symmetrically over all or part of the spring 17, 27, 37, 47, 57, 77.

In light of the above explanations, the spring and/or the additional elastic energy accumulating means may advantageously be formed by material removal techniques, i.e. of the negative type, such as a deep reactive ion etch of a single crystal silicon wafer, or conversely, by material adding techniques, i.e. of the positive type, such as electroforming combining at least one photolithography step and at least one galvanoplasty step.

Alternatively, the spring and/or the additional elastic energy accumulating means may also be formed by hybrid positive and negative techniques, such as an etched substrate wherein the etched portions are intended to receive an at least partially amorphous material by hot forming such as a metal or a metal alloy.

Thus, owing to the precision of the positive and/or negative manufacturing techniques, it is possible to mass produce asymmetrical springs which allow the barrel torque to be personalised according to the winding tension of said springs. Thus it is perfectly possible to develop a spring which, by way of example, regardless of its winding tension, allows a substantially constant barrel torque.

However, since this type of technique can limit the thickness of the fabricated part, it is proposed that the barrel includes several stacked springs which work in parallel to obtain, for example, a height H similar to current S-shaped springs.

It is thus clear that the spring and/or the additional elastic energy accumulating means may be formed from silicon, such as, in a non-limiting manner, single crystal silicon, silicon carbide, nitride or oxide which may or in crystallised or non-crystallised form, or an amorphous or non-amorphous metallic material, such as, non-exhaustively, nickel or a nickel and phosphorus based alloy.

Of course, this invention is not limited to the illustrated example but is capable of various variants and alterations that will appear to those skilled in the art. In particular, the shapes of protuberances 16, 26, 36, 46, 56, 76 of the additional elastic energy accumulating means shown in FIGS. 2 to 8 may differ to make the torque supplied by the barrel more constant and higher.

Moreover, the invention is intended for a mechanical energy source in general and not specifically for a timepiece barrel.

What is claimed is:
1. A barrel, comprising:
(a) a box having an internal wall;
(b) a pivot arbour disposed in the box and having an external wall;
(c) at least one spring, having a spiral shaped portion, and being mounted between the internal wall of the box and the external wall of the pivot arbour, wherein the at least one spiral spring is windable to supply mechanical energy; and
(d) a device for increasing the torque of the at least one spiral spring, wherein the device for increasing the torque of the at least one spring includes additional elastic energy accumulating means provided in addition to the spiral shaped portion of said the at least one spring, and wherein the elastic energy accumulating means is personalizable according to a winding tension of the at least one spring.

2. The barrel according to claim 1, wherein the additional elastic energy accumulating means is integral with the at least one spiral spring.

3. The barrel according to claim 1, wherein one of the at least one spring or the additional elastic energy accumulating means or the at least one spring and the additional elastic energy accumulator are formed from a silicon base.

4. The barrel according to claim 1, wherein one of the at least one spring or the additional elastic energy accumulating means, or the at least one spring and the additional elastic energy accumulator are formed from a metal or metal alloy base.

5. A timepiece, comprising:
a movement; and
a barrel according to claim 1 operatively connected to the movement.

6. A barrel comprising:
(a) a box having an internal wall;
(b) a pivot arbour disposed in the box and having an external wall;
(c) at least one spring, having a spiral shaped portion, and being mounted between the internal wall of the box and the external wall of the pivot arbour, wherein the at least one spring is windable to supply mechanical energy; and
(d) at least two elastic protuberances projecting over at least one part of the spiral shaped portion of the at least one spring, the at least two elastic protuberances being disposed to accumulate elastic energy.

7. The barrel according to claim 6, wherein the at least two protuberances comprise a thickness or a height or a thickness and a height that are constant.

8. The barrel according to claim 6, wherein the at least two protuberances comprise a thickness or a height or a thickness and a height that are not constant.

9. The barrel according to claim 6, wherein the at least two elastic protuberances are contiguous.

10. The barrel according to claim 6, wherein the at least two elastic protuberances extend from the at least one spring towards the arbour.

11. The barrel according to claim 6, wherein the at least two elastic protuberances extend from the at least one spring towards the internal wall of the box.

12. The barrel according to claim 6, wherein the at least two elastic protuberances are integral with the at least one spiral spring.

13. The barrel according to claim 6, wherein the at least one spring, or the at least two elastic protuberances, or the at least one spring and the at least two elastic protuberances are formed from a silicon base.

14. The barrel according to claim 6, wherein the at least one spring, or the at least two elastic protuberances, or the at least one spring and the at least two elastic protuberances are formed from a metal or metal alloy base.

* * * * *